E. B. DAKE.
PISTON RING.
APPLICATION FILED JUNE 15, 1916.

1,252,324.

Patented Jan. 1, 1918.

E. B. Dake, Inventor

UNITED STATES PATENT OFFICE.

EDWARD B. DAKE, OF MUSKEGON, MICHIGAN.

PISTON-RING.

1,252,324.

Specification of Letters Patent.

Patented Jan. 1, 1918.

Application filed June 15, 1916. Serial No. 103,785.

*To all whom it may concern:*

Be it known that I, EDWARD B. DAKE, a citizen of the United States, residing at Muskegon, in the county of Muskegon and State of Michigan, have invented a new and useful Piston-Ring, of which the following is a specification.

This invention relates to piston rings, one of its objects being to provide a two part ring the members of which are so constructed and assembled that, when the members expand, as they wear, they will coöperate to tighten within the groove in the piston.

A still further object is to provide a piston ring which, when compressed within a groove, will cause one of the members of the ring to be contracted, thus insuring a tight leak-proof connection between the ring and the walls of the groove of the piston and also between the piston and the wall of the cylinder in which it is located.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made without departing from the spirit of the invention.

In the accompanying drawing the preferred form of the invention has been shown.

In said drawings:—

Figure 1:
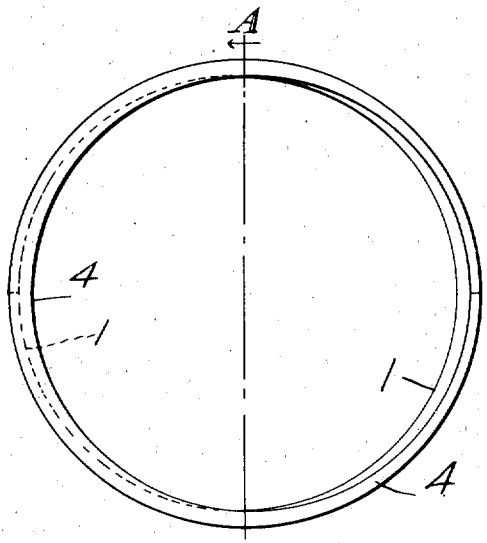
Figure 1 is an elevation of a piston ring embodying the present improvements.
Figure 2:
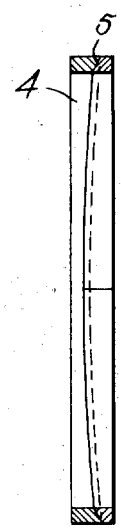
Fig. 2 is a section on line A—B Fig. 1.
Figures 3, 4:
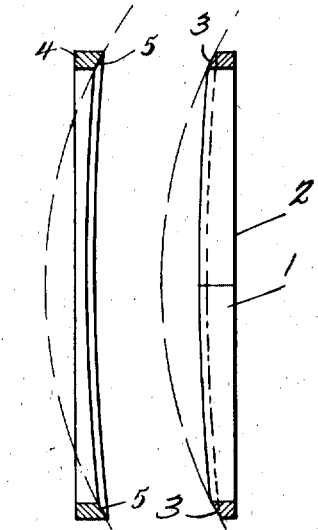
Fig. 3 is a section through one of the members of the ring.
Fig. 4 is a section through the other member of the ring.
Figure 5:
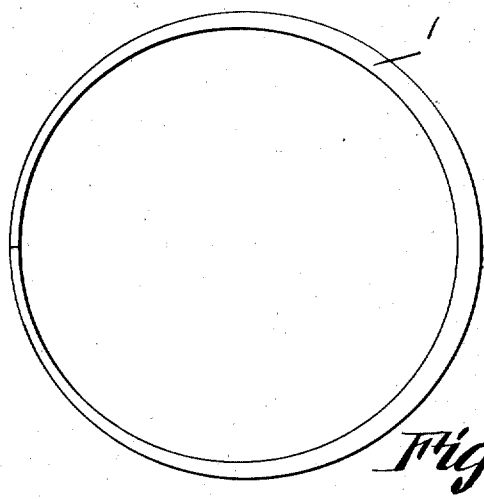
Figs. 5 and 6 are elevations of the respective members of the ring.
Figure 6:
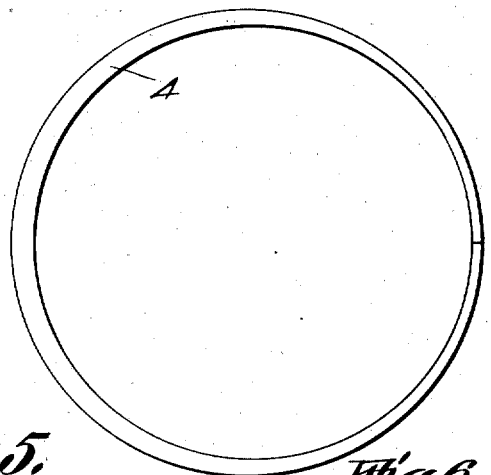

Referring to the figures by characters of reference 1 designates a split ring having a flat face 2 while the thickness of the ring gradually increases from the ends of the ring to a point diametrically opposed thereto. In other words, the ring has a circular outer periphery and a circular inner periphery, but the two peripheries are eccentrically disposed, they being located closest together at the point where the ring is split. Furthermore while the ring has one flat face, the other face is tapered, as at 3, so as to form a part of the surface of an imaginary sphere. The other member 4 of the piston ring is similar to the ring 1 with the exception that while one face is flat, the other face is flared as at 5 so as to form part of the surface of an imaginary sphere. Thus when the two rings 1 and 4 are oppositely disposed, the tapered face 3 of ring 1 will fit snugly within the flared face 5 of ring 4 and the thin portion of each ring will bear against the thick portion of the opposed ring with the result that the ends of the two rings will be practically diametrically opposed, as indicated in Fig. 1.

It is designed to provide a piston ring the extreme thickness of which is slightly greater than the width of the piston groove in which the ring is to be placed. Thus it will be seen that by forcing a ring such as described into the piston groove, the flared face 5 of the ring 4 will press tightly against the tapered face 3 of the ring 1 and thus tend to compress ring 1 within the groove. As the piston ring becomes worn it will expand against the wall of the cylinder, this expansion causing the ends of each ring 1 and 4 to move apart and to ride upon the broad portion of the opposed ring so that said rings 1 and 4 will be shifted laterally relative to each other and thereby be held tight against the walls of the groove.

By providing the meeting faces of the members of the ring with the peculiar contours described, the ring is capable of conforming to a badly worn or untrue groove in the piston and an efficient packing is thus insured.

What is claimed is:—

1. A piston ring consisting of opposed split rings each having eccentrically disposed outer and inner peripheries, each of said rings being gradually reduced in width and increased in thickness from the split end thereof to the opposed portion of the ring, said rings having interfitting faces coöperating to expand one of the rings when said rings are pressed together.

2. A piston ring including opposed split rings each having its outer and inner peripheries eccentrically disposed, each of said rings gradually diminishing in width but increasing in thickness from the ends to the diametrically opposed portion of the ring, said rings engaging faces, one of which is tapered to constitute a spreading means while the other one of said faces is flared, said rings being oppositely disposed with the thin portion of each ring in engagement with the thick portion of the opposed ring.

3. A piston ring including opposed split rings each having its outer and inner peripheries eccentrically disposed, each of said rings gradually diminishing in width but increasing in thickness from the ends to the diametrically opposed portion of the ring, said rings having engaging faces, one of which is tapered to constitute a spreading means while the other one of said faces is flared, said rings being oppositely disposed with the thin portion of each ring in engagement with the thick portion of the opposed ring, one of said rings being adjustable angularly to expand it relative to the other ring and to increase the distance between the non-contacting faces of the rings.

4. A piston ring including oppositely disposed split rings each diminishing in width and increasing in thickness from the ends of the ring to the diametrically opposed portion thereof, one of said rings being adjustable angularly relative to the other ring, said rings having contacting faces coöperating to expand one of the rings and to increase the distance between the non-contacting faces of the two rings during such angular adjustment.

In testimony that I claim the foregoing as my own, I have hereto affixed my signature in the presence of two witnesses.

EDWARD B. DAKE.

Witnesses:
WALTER HYMA,
PALMER ARNEBERG.

Copies of this patent may be obtained for five cents each, by addressing the "Commissioner of Patents, Washington, D. C."